(12) United States Patent
Furman et al.

(10) Patent No.: US 11,989,572 B2
(45) Date of Patent: May 21, 2024

(54) COMPUTER SYSTEM ENABLED WITH RUNTIME SOFTWARE MODULE TRACKING

(71) Applicant: Kodem Security Ltd., Tel Aviv (IL)

(72) Inventors: Pavel Furman, Netanya (IL); Idan Bartura, Herzliya (IL); Aviv Mussinger, Tel Aviv (IL)

(73) Assignee: KODEM SECURITY LTD., Tel Aviv (IL)

( * ) Notice: Subject to any disclaimer, the term of this patent is extended or adjusted under 35 U.S.C. 154(b) by 92 days.

(21) Appl. No.: 17/813,220

(22) Filed: Jul. 18, 2022

(65) Prior Publication Data

US 2024/0020140 A1  Jan. 18, 2024

(51) Int. Cl.
*G06F 9/451* (2018.01)
*G06F 9/30* (2018.01)
*G06F 9/455* (2018.01)

(52) U.S. Cl.
CPC ...... *G06F 9/45508* (2013.01); *G06F 9/30043* (2013.01); *G06F 9/30123* (2013.01)

(58) Field of Classification Search
CPC .................................................... G06F 9/451
See application file for complete search history.

(56) References Cited

U.S. PATENT DOCUMENTS

| | | | |
|---|---|---|---|
| 6,513,153 B1 | 1/2003 | Lee | |
| 7,870,610 B1* | 1/2011 | Mitchell | G06F 21/53 726/25 |
| 10,691,577 B2 | 6/2020 | Podjarny et al. | |
| 2004/0117547 A1* | 6/2004 | Ogihara | G11B 27/329 711/112 |
| 2008/0282354 A1* | 11/2008 | Wobber | G06F 21/6218 726/26 |
| 2015/0156202 A1* | 6/2015 | Clark | G06F 21/604 726/4 |
| 2021/0012021 A1* | 1/2021 | Pickhardt | G06F 21/53 |

(Continued)

OTHER PUBLICATIONS

Lindkvist, E. (2022). Runtime Detection of use of Vulnerable Code with a Fine-Grained Resolution.

(Continued)

*Primary Examiner* — Jae U Jeon
(74) *Attorney, Agent, or Firm* — Browdy and Neimark, PLLC

(57) ABSTRACT

There is provided a computer system of runtime identification of a dynamic loading of a software module, the software module being associated with a first application framework, the system comprising a processing circuitry configured to: a) detect, in a first interposition function, an invocation of a first function, the first function being associated with loading of software-modules within a first application framework; b) identify a software-module being loaded, the identifying utilizing, at least, at least one of: i) parameter data supplied in the invocation of the first function, ii) a context of an operating system process invoking the first function, and ii) data that was stored responsive to detecting, by a respective interposition function, one or more prior invocations of respective functions associated with loading of software-modules within the first application framework; and c) add the identified software-module to a list of software-modules.

19 Claims, 11 Drawing Sheets

(56) References Cited

U.S. PATENT DOCUMENTS

2021/0117548 A1    4/2021  Gokhman et al.
2021/0405997 A1  12/2021  Delchev et al.
2022/0075876 A1    3/2022  Rioux et al.

OTHER PUBLICATIONS

Keniston et al., "Kernel Probe, Linux Tracing Technologies", downloaded from www.kernel.org/doc/html/latest/trace/kprobes.html (Jul. 12, 2022).

Xu, et al., Detecting Exploit Code Execution in Loadable Kernel Modules, Proceedings of the 20th Annual Computer Security Applications Conference, 2004, pp. 101-110.

* cited by examiner

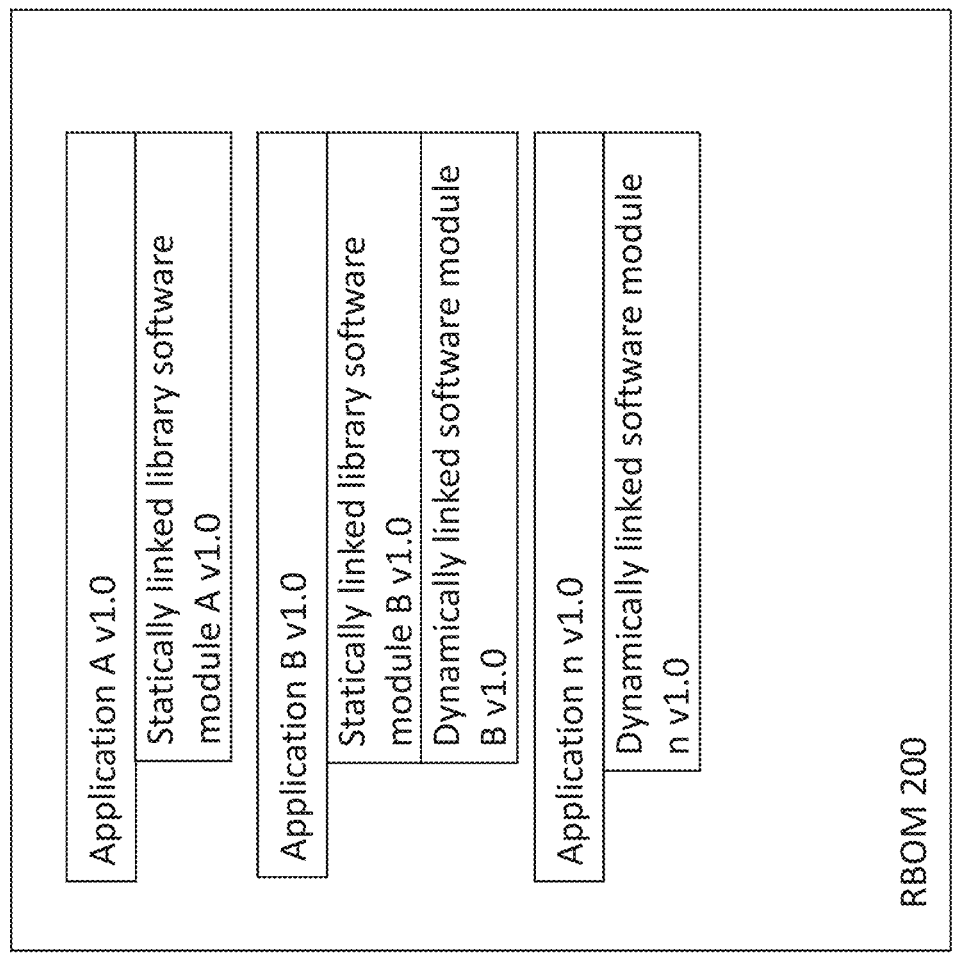

COMPUTER SYSTEM ENABLED WITH RUNTIME SOFTWARE MODULE TRACKING

TECHNICAL FIELD

The presently disclosed subject matter relates to computer security, and in particular to runtime detection of active software modules.

BACKGROUND

Problems of computer system security have been recognized in the conventional art and various techniques have been developed to provide solutions.

GENERAL DESCRIPTION

According to one aspect of the presently disclosed subject matter there is provided a computer system of runtime identification of a dynamic loading of a software module, the software module being associated with a first application framework, the system comprising a processing circuitry configured to:
 a) detect, in a first interposition function, an invocation of a first function, the first function being associated with loading of software-modules within a first application framework;
 b) identify a software-module being loaded, the identifying utilizing, at least, at least one of:
  i) parameter data supplied in the invocation of the first function,
  ii) a context of an operating system process invoking the first function, and
  iii) data that was stored responsive to detecting, by a respective interposition function, one or more prior invocations of respective functions associated with loading of software-modules within the first application framework; and
 c) add the identified software-module to a list of software-modules, wherein the list comprises zero or more active software-modules.

In addition to the above features, the system according to this aspect of the presently disclosed subject matter can comprise one or more of features (i) to (x) listed below, in any desired combination or permutation which is technically possible:
 (i) the identifying the software module utilizes the parameter data, and wherein the utilizing comprises:
  decoding data that is located at an offset from a memory address that is comprised in the parameter data,
 (ii) the identifying the software module utilizes at least one of:
  a) a process identifier of the invoking operating system process context, and
  b) an element of the invoking operating system process context indicative of a result returned by the first function.
 (iii) the processing circuitry is further configured to, prior to step a):
  A) detect, by a second interposition function, an invocation of a second function associated with loading of software-modules within the first application framework; and
  B) store data that comprises, at least, at least one of:
   i) parameter data supplied in the invocation of the second function, and
   ii) context of an operating system process invoking the second function.
 (iv) the processing circuitry is further configured to, subsequent to step B):
  C) repeat A)-B) for one or more additional functions associated with loading of software-modules within the first application framework, and respective interposition functions.
 (v) the processing circuitry is further configured to, subsequent to step c):
  d) perform a)-c) repeatedly, thereby giving rise to a runtime software bill-of-materials (RBOM).
 (vi) the processing circuitry is further configured to, subsequent to step d):
  repeat a)-d) for one or more additional application frameworks,
  thereby giving rise to an RBOM comprising modules of multiple application frameworks.
 (vii) the first application framework is of an application framework type selected from a list consisting of: interpreted language, intermediate language, and compiled language.
 (viii) the first application framework is selected from a list consisting of: Python, Java, Nodejs, C, C++, and C#.
 (ix) the processing circuitry is further configured to:
  compare the RBOM to a given list of software modules of the first application framework, wherein the given list is derivative of an at least partial static analysis of the computer system; and
  responsive to a presence of a software module in the RBOM that is absent from the given list, raising an alert.
 (x) the processing circuitry is further configured to:
  receive an alert pertaining to a first software module; and
  determine a priority of the alert in accordance with whether the first software module is present in the RBOM.

According to another aspect of the presently disclosed subject matter there is provided a computer system of runtime identification of a dynamic loading of a software module, the software module being associated with a first application framework, the system comprising a processing circuitry configured to:
 a) detect, in a first interposition function, each invocation of a first function, the first function being associated with loading of software-modules within the first application framework; and
 b) responsive to, at least, at least one of:
  a. parameter data supplied in a given invocation, and
  b. a context of an invoking OS process of the given invocation
  meeting a respective software-module load completion criterion:
   A. identify a software-module being loaded, the identifying utilizing, at least, at least one of:
    i) parameter data supplied in the given invocation,
    ii) a context of an invoking operating system process of the given invocation, and
    iii) data that was stored responsive to detecting, by respective interposition functions, respective prior invocations of respective functions associated with loading of software-modules within the first application framework; and
   B. add the identified software-module to a list of software-modules, wherein the list comprises zero or more active software modules, thereby giving rise to a runtime software bill-of-materials (RBOM).

This aspect of the disclosed subject matter can further optionally comprise one or more of features (i) to (x) listed above with respect to the system, mutatis mutandis, in any desired combination or permutation which is technically possible.

According to another aspect of the presently disclosed subject matter there is provided a computer-implemented method of runtime identification of a dynamic loading of a software module, the software module being associated with a first application framework, the method comprising:
  a) detecting, by a first interposition function, an invocation of a first function, wherein the first function is associated with loading of software-modules within the first application framework;
  b) identifying a software-module being loaded,
    the identifying utilizing, at least one of:
    i) parameter data supplied in the invocation of the first function,
    ii) context of an operating system process invoking the first function, and
    iii) data that was stored responsive to detecting, by a respective interposition function, one or more prior invocations of respective functions associated with loading of software-modules within the first application framework; and
  c) adding the identified software-module to a list of software-modules, wherein the list comprises zero or more active software modules.

This aspect of the disclosed subject matter can further optionally comprise one or more of features (i) to (x) listed above with respect to the system, mutatis mutandis, in any desired combination or permutation which is technically possible.

According to another aspect of the presently disclosed subject matter there is provided a computer-implemented method of runtime identification of a dynamic loading of a software module, the software module being associated with a first application framework, the method comprising:
  a) detecting, in a first interposition function, each invocation of a first function, the first function being associated with loading of software-modules within the first application framework; and
  b) responsive to, at least, at least one of:
    a. parameter data supplied in a given invocation, and
    b. a context of an invoking OS process of the given invocation
    meeting a respective software-module load completion criterion:
    A. identifying a software-module being loaded, the identifying utilizing, at least, at least one of:
      i) parameter data supplied in the given invocation,
      ii) a context of an invoking operating system process of the given invocation, and
      iii) data that was stored responsive to detecting, by respective interposition functions, respective prior invocations of respective functions associated with loading of software-modules within the first application framework; and
    B. adding the identified software-module to a list of software-modules, wherein the list comprises zero or more active software modules,
thereby giving rise to a runtime software bill-of-materials (RBOM).

This aspect of the disclosed subject matter can further optionally comprise one or more of features (i) to (x) listed above with respect to the system, mutatis mutandis, in any desired combination or permutation which is technically possible.

According to another aspect of the presently disclosed subject matter there is provided a computer program product comprising a computer readable non-transitory storage medium containing program instructions, which program instructions when read by a processor, cause the processing circuitry to perform a method of runtime identification of a dynamic loading of a software module, the software module being associated with a first application framework, the method comprising:
  a) detecting, by a first interposition function, an invocation of a first function, wherein the first function is associated with loading of software-modules within the first application framework;
  b) identifying a software-module being loaded,
    the identifying utilizing, at least one of:
    i) parameter data supplied in the invocation of the first function,
    ii) context of an operating system process invoking the first function, and
    iii) data that was stored responsive to detecting, by a respective interposition function, one or more prior invocations of respective functions associated with loading of software-modules within the first application framework; and
  c) adding the identified software-module to a list of software-modules, wherein the list comprises zero or more active software modules.

This aspect of the disclosed subject matter can further optionally comprise one or more of features (i) to (x) listed above with respect to the system, mutatis mutandis, in any desired combination or permutation which is technically possible.

According to another aspect of the presently disclosed subject matter there is provided a computer program product comprising a computer readable non-transitory storage medium containing program instructions, which program instructions when read by a processor, cause the processing circuitry to perform a method of runtime identification of a dynamic loading of a software module, the software module being associated with a first application framework, the method comprising:
  a) detecting, in a first interposition function, each invocation of a first function, the first function being associated with loading of software-modules within the first application framework; and
  b) responsive to, at least, at least one of:
    a. parameter data supplied in a given invocation, and
    b. a context of an invoking OS process of the given invocation
    meeting a respective software-module load completion criterion:
    A. identifying a software-module being loaded, the identifying utilizing, at least, at least one of:
      i) parameter data supplied in the given invocation,
      ii) a context of an invoking operating system process of the given invocation, and
      iii) data that was stored responsive to detecting, by respective interposition functions, respective prior invocations of respective functions associated with loading of software-modules within the first application framework; and
    B. adding the identified software-module to a list of software-modules, wherein the list comprises zero or more active software modules, thereby giving rise to a runtime software bill-of-materials (RBOM).

This aspect of the disclosed subject matter can further optionally comprise one or more of features (i) to (x) listed above with respect to the system, mutatis mutandis, in any desired combination or permutation which is technically possible.

BRIEF DESCRIPTION OF THE DRAWINGS

In order to understand the invention and to see how it can be carried out in practice, embodiments will be described, by way of non-limiting examples, with reference to the accompanying drawings, in which:

FIG. 2 illustrates an example runtime bill of materials (RBOM), in accordance with some embodiments of the presently disclosed subject matter;

DETAILED DESCRIPTION

Figure 1A:
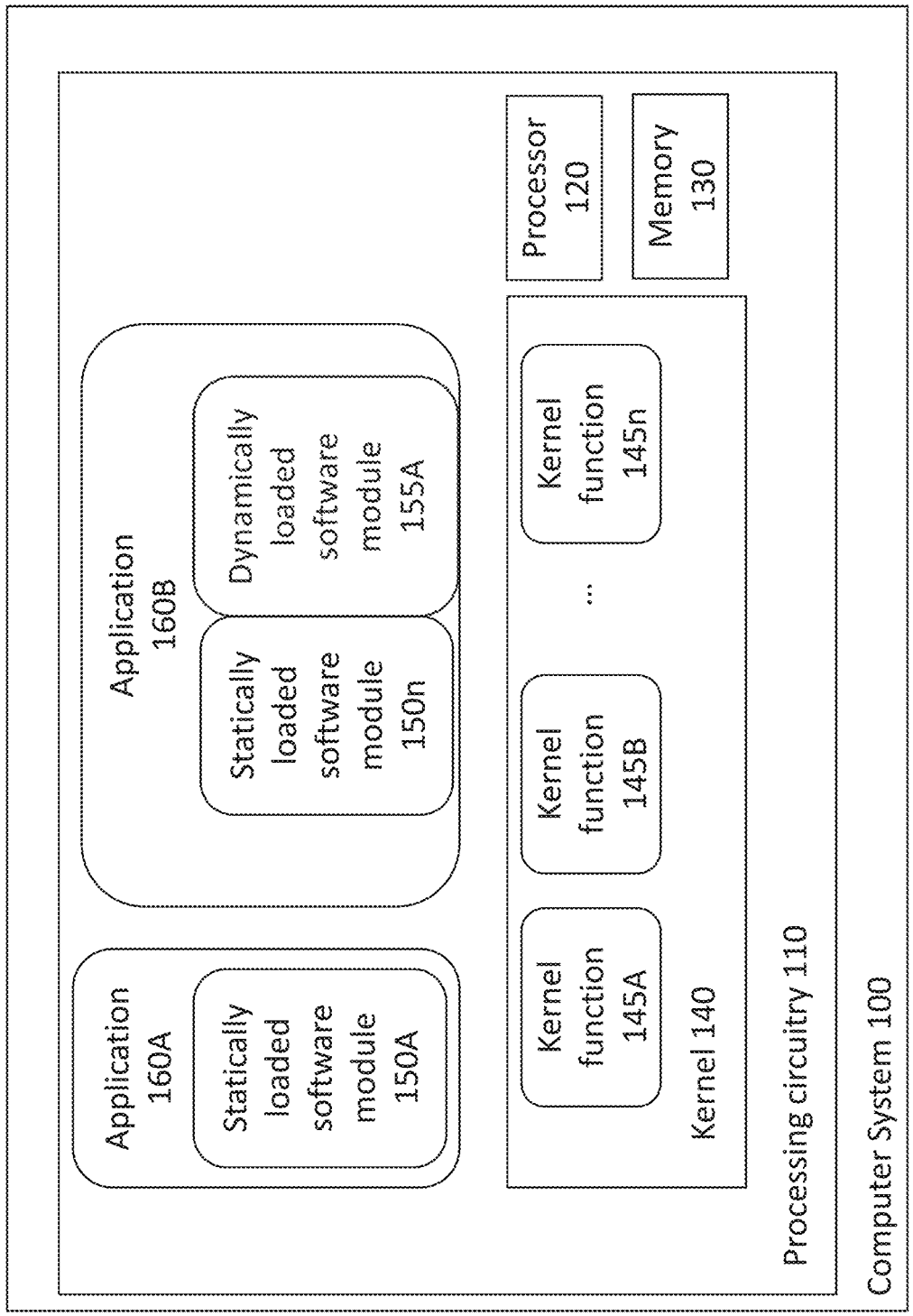
FIGS. 1A and 1B illustrate logical block diagrams of example software layers of prior art computer systems that implement software module loading, in accordance with some embodiments of the presently disclosed subject matter.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "comparing", "determining", "calculating", "receiving", "providing", "obtaining", "assigning", "displaying" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the processor, mitigation unit, and inspection unit therein disclosed in the present application.

The terms "non-transitory memory" and "non-transitory storage medium" used herein should be expansively construed to cover any volatile or non-volatile computer memory suitable to the presently disclosed subject matter.

The operations in accordance with the teachings herein may be performed by a computer specially constructed for the desired purposes or by a general-purpose computer specially configured for the desired purpose by a computer program stored in a non-transitory computer-readable storage medium.

Embodiments of the presently disclosed subject matter are not described with reference to any particular programming language. It will be appreciated that a variety of programming languages may be used to implement the teachings of the presently disclosed subject matter as described herein.

Some embodiments of the presently disclosed subject matter are directed to systems and methods of effectively determining and maintaining an up-to-date list of active software modules in a computer system. Among the advantages of effective maintenance of such a list (termed a Runtime Bill-of-Materials—or RBOM) are: enablement enhanced computer security (such as detection of unauthorized software) and more efficient system management (such as prioritization of software updates).

Some embodiments of the presently disclosed subject matter monitor loading of software modules of particular "application frameworks". As used herein, the term "application framework" denotes a structural management layer for building and running programs on a given computer system.

An application framework is of a particular application framework type. Broadly speaking, several application framework types can be supported, such as for:

interpreted languages (such as Python and node.js), intermediate languages (such as Java), and compiled languages (such as C and C++).

Static bills-of-materials (static BOM) for software can be compiled e.g. via analysis of binary code objects. However, many code objects are never or rarely activated, or may include code paths that are never or are rarely executed. Accordingly a static BOM will generally include software modules that are absent from the RBOM.

Attention is directed to FIG. 1A, which illustrates a logical block diagram of example software layers of a prior art computer system that implements dynamic software module loading, in accordance with some embodiments of the presently disclosed subject matter.

The block diagram of FIG. 1A shows software layers of computer system 100 as they can exist at a particular timestamp after system initialization. Computer system 100 can include processing circuitry 110, which in turn can include processor 120 and memory 130. Processing circuitry 110 can be configured to execute several functional modules in accordance with computer-readable instructions implemented on a non-transitory computer-readable storage medium. Such functional modules are referred to hereinafter as comprised in the processing circuitry. These modules can include, for example, kernel 240, applications 160A 160B etc.

Kernel 140 can be the kernel of a general-purpose or specialized operating system (e.g. Linux, Microsoft Windows™, etc.). Kernel functions 145A 145B 145n can be externally invocable kernel entry points (e.g. open( ) close( ) read( ) write( ) etc. in Linux).

At a given time after system initialization, there can be some number of applications 160A 160B loaded. These applications can include statically linked software modules 150A 150n which are incorporated into application object code at build time. Additionally, at the given time, application 160B can include dynamically linked software module 155A, which was—for example—located on disk and loaded by the operating system in response to application initialization.

Figure 1B:
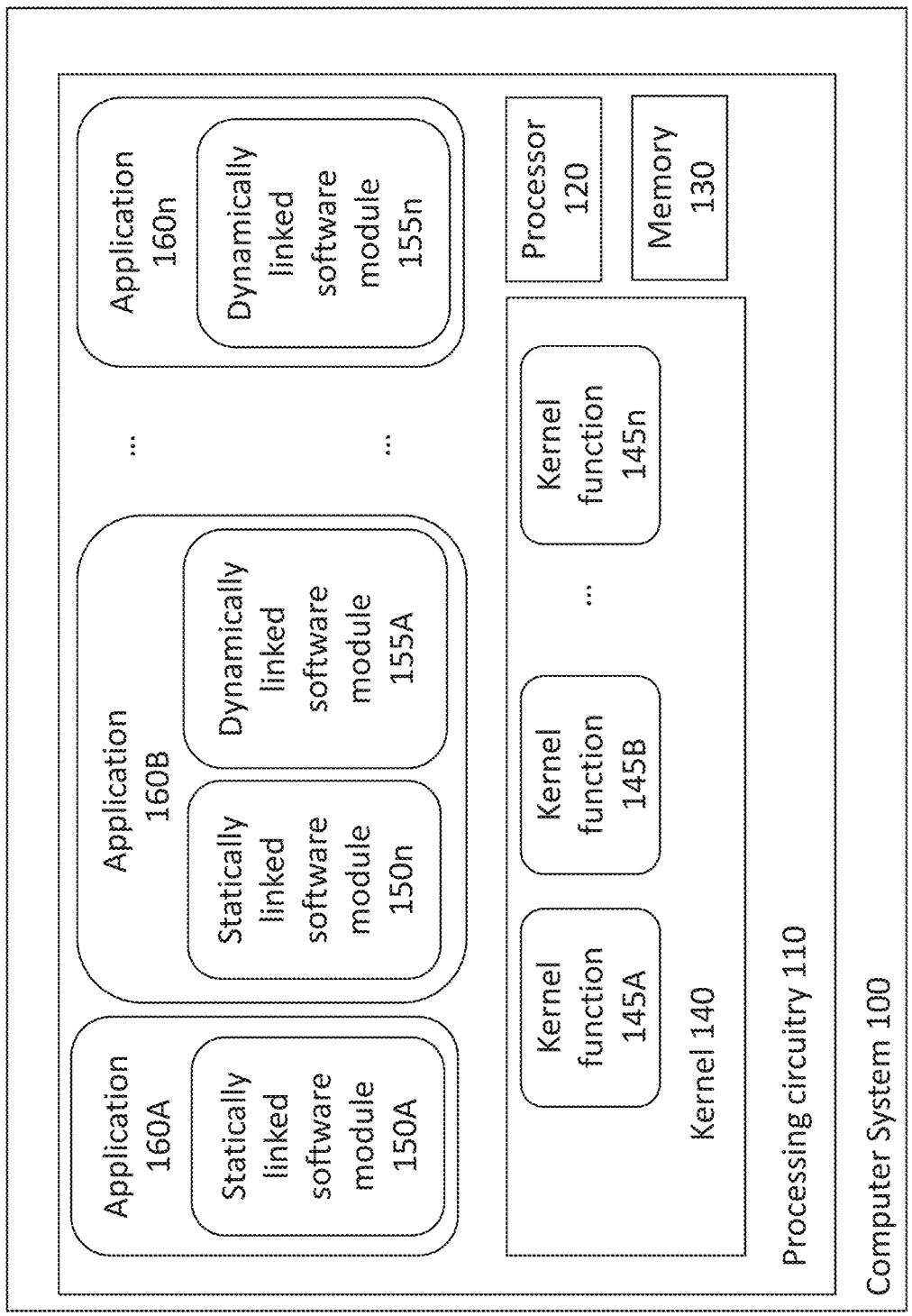

FIG. 1B illustrates an updated example block diagram of the software layers at a later timestamp. At this time, additional application 160n has been loaded, as has additional dynamically linked (and loaded) software module 155n.

Attention is directed to FIG. 2, which illustrates an example runtime bill of materials (RBOM), in accordance with some embodiments of the presently disclosed subject matter.

An RBOM can be a representation of names (and in some embodiments, version numbers) of applications and software modules loaded on a given computer system at a given time. RBOM 200 shown in FIG. 2 illustrates a hierarchical list of software modules of various types (application, statically linked library, dynamically linked and loaded module) with respective version numbers.

It is noted that an RBOM can be stored on a storage medium (e.g. hard-disk-drive, solid-state drive etc.) in various formats (e.g. text, compressed text, images, with or without encryption etc.).

Figure 3A:
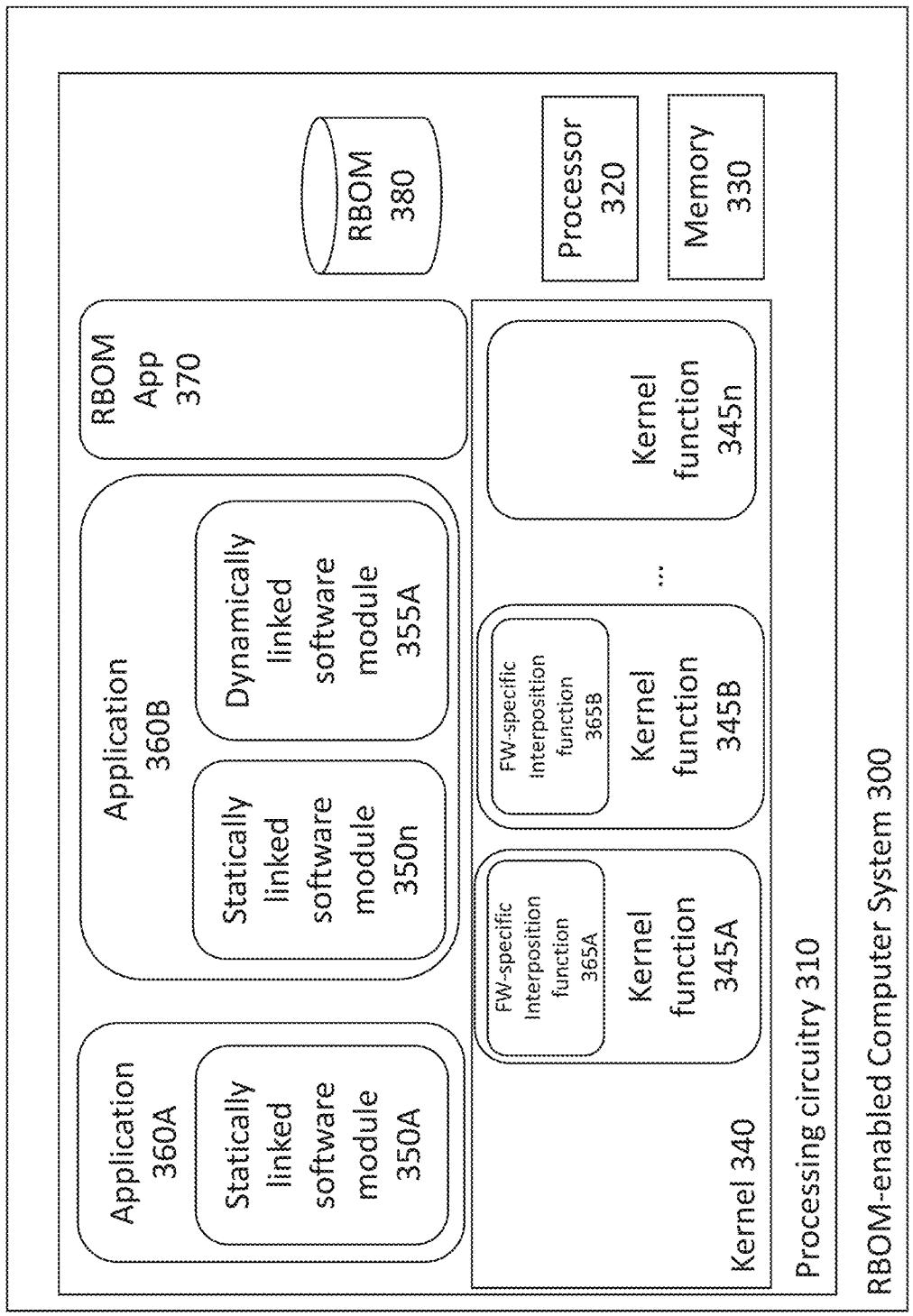
FIGS. 3A-3B are block diagrams of example computer systems configured for determination of a software runtime bill-of-materials (RBOM), in accordance with some embodiments of the presently disclosed subject matter.
Figure 3B:
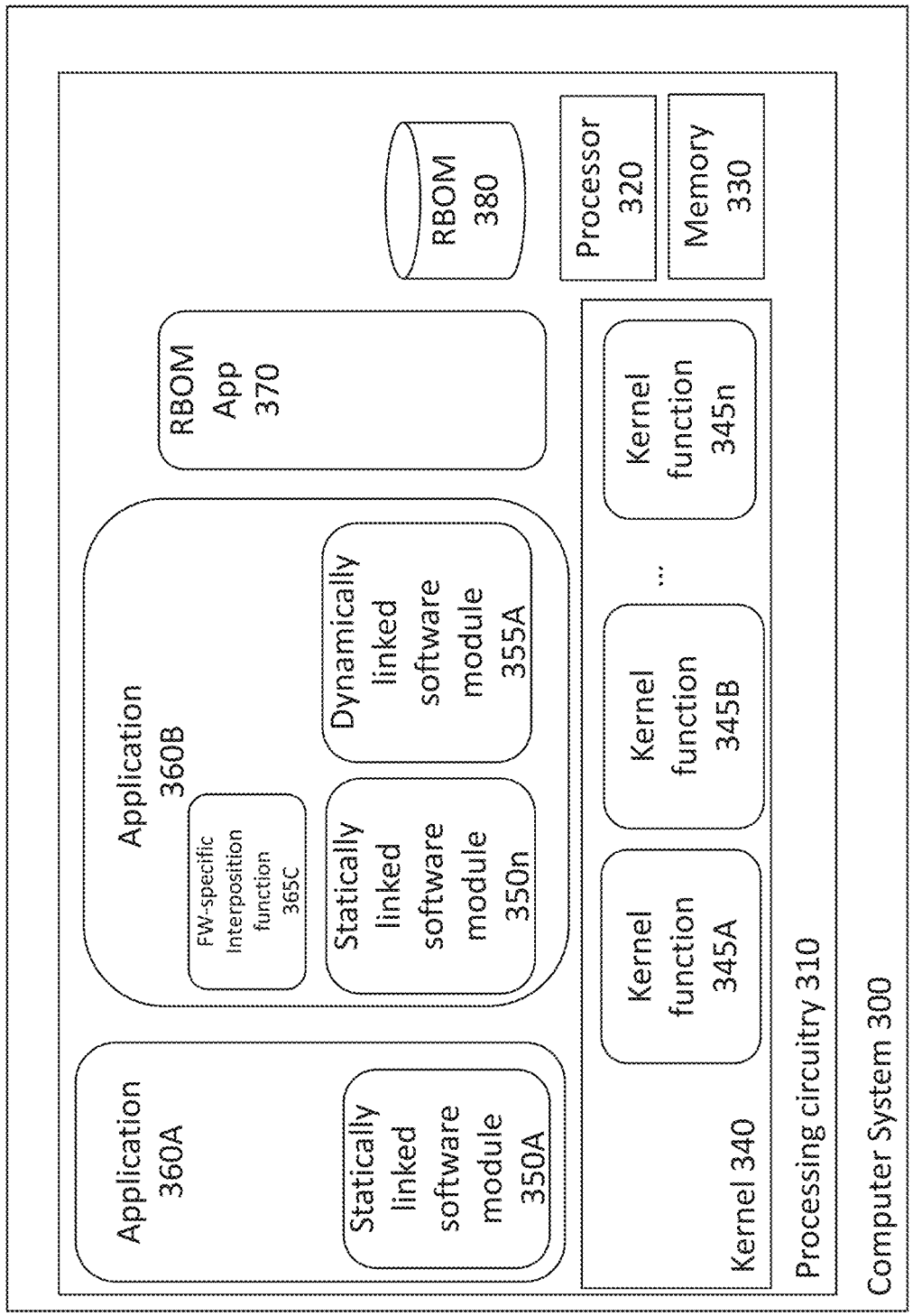

Attention is directed to FIGS. 3A-3B, which are block diagrams of example computer systems configured for determination of a software runtime bill-of-materials (RBOM), in accordance with some embodiments of the presently disclosed subject matter.

RBOM-enabled computer system 300 can include processing circuitry 310, which in turn can include processor 320 and memory 330.

Processor 320 can be a suitable hardware-based electronic device with data processing capabilities, such as, for example, a general purpose processor, digital signal processor (DSP), a specialized Application Specific Integrated Circuit (ASIC), one or more cores in a multicore processor etc. Processor 320 can also consist, for example, of multiple processors, multiple ASICs, virtual processors, combinations thereof etc.

Memory 330 can be, for example, a suitable kind of volatile and/or non-volatile storage, and can include, for example, a single physical memory component or a plurality of physical memory components. Memory 330 can also include virtual memory. Memory 330 can be configured to, for example, store various data used in computation.

Processing circuitry 310 can be configured to execute several functional modules in accordance with computer-readable instructions implemented on a non-transitory computer-readable storage medium. Such functional modules are referred to hereinafter as comprised in the processing circuitry. These modules can include, for example, kernel 340, applications 360A 360B, RBOM app 370, and RBOM 380.

Interposition functions can be software programs that are "attached" (e.g. via an operating system) to specific locations in memory such as kernel functions, or to specific user application functions. In some embodiments, an interposition function is activated (e.g. by the operating system) upon invocation (e.g. by an application) of a kernel function or of a specific userspace application function onto which the interposition function has been attached.

By way of non-limiting example: interposition functions can be programs utilizing the eBPF facility described e.g. at https://www.infoq.com/articles/gentle-linux-ebpf-introduction/) that are attached to via an operating system mechanism such as Linux kprobe cf. https://www.kernel.org/doc/html/latest/trace/kprobes.html, or uprobe.

In some examples, the function to which an interposition function is attached executes after the interposition function has completed. In some other examples, the function to which an interposition function is attached is executed concurrently with the interposition function. In some other examples, the function to which an interposition function is attached is executed at least partly prior to the interposition function.

In some examples, an interposition function—when invoked—accesses parameter data (e.g. function arguments in a language such as C or Java) that was supplied by a calling application to the invoked function to which the interposition function is attached. By way of non-limiting example: an interposition function can access parameter data that was placed on a processor stack. The term "parameter data" as used herein also includes data which is identical to, derivative of, or informative of data (such as function call parameter data) that was also placed on the processor stack.

In some embodiments of the presently disclosed subject matter, RBOM-enabled computer system 300 is configured so that specific interposition functions are attached to application-framework specific target functions that perform all or part of the application framework-specific logic for software module loading.

In some such embodiments, such interposition functions can use application-framework-specific methods such as those described hereinbelow to monitor the invocations of functions utilized in loading of software modules, and—for example—store data to memory (such as eBPF Map memory) that can be shared with RBOM app 370. RBOM app 370 (for example) can then identify (at runtime) the software modules being loaded, and then maintain RBOM 380 accordingly.

It is noted that in some embodiments, processing circuitry 310 is configured to activate an attached interposition function to detect each invocation of the software function 345A (i.e. the function that is a non-final step of the multi-step software-module load process). It is further noted that in some embodiments, processing circuitry 310 is configured to activate an attached interposition function to detect a subset of the_invocations of the software function 345A.

In FIG. 3A, framework-specific interposition functions 365A 365B are installed in kernel functions 345A 345B respectively. This configuration corresponds to an example configuration of monitoring Python software modules, as described hereinbelow.

In FIG. 3B, framework-specific interposition functions 365C is installed in application 360B. This configuration corresponds to an example configuration of monitoring Java software modules, as described hereinbelow.

Figure 4:
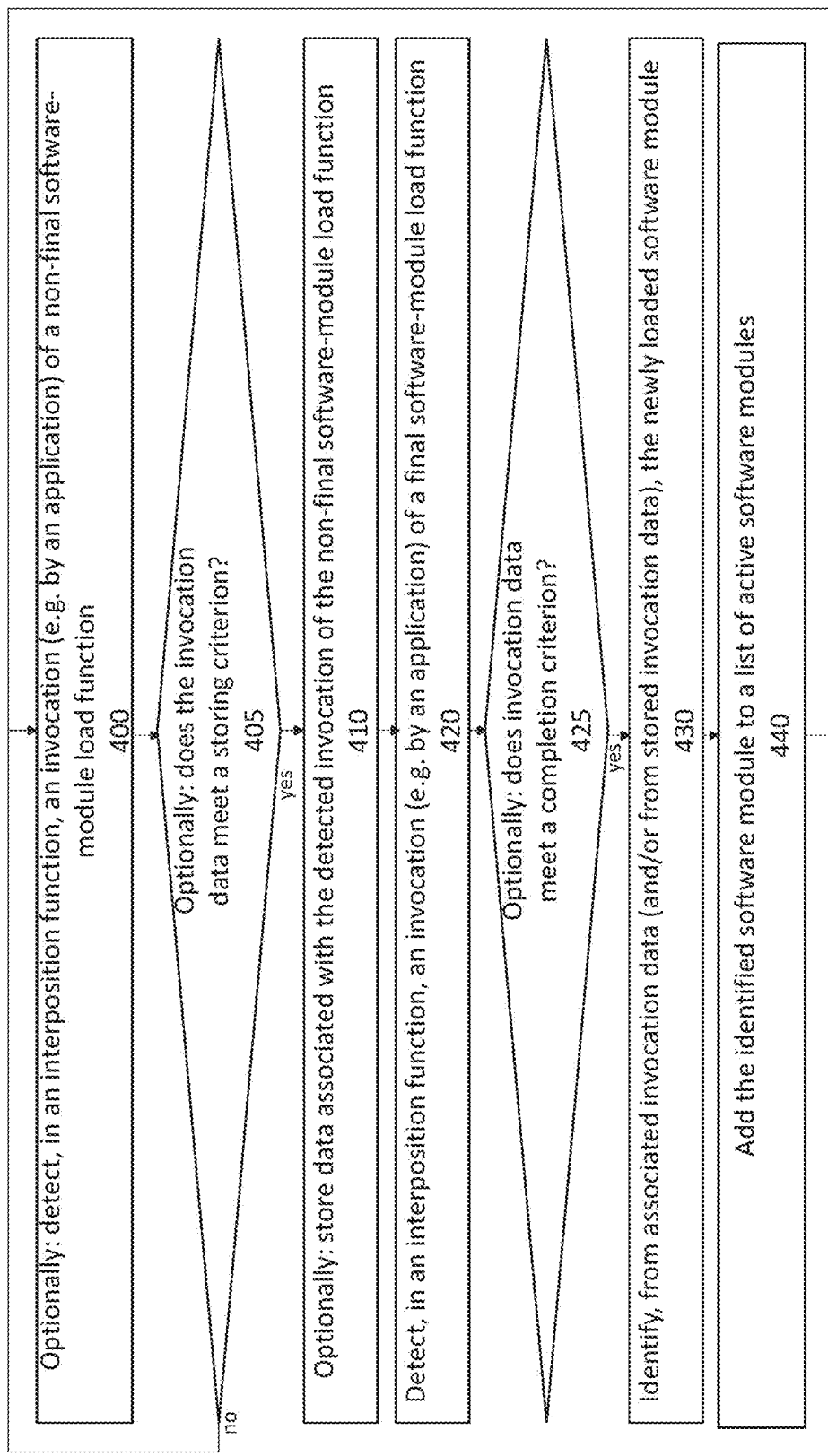
FIG. 4 illustrates a flow diagram of an example method of identifying, during runtime loading, a software-module associated with a first application framework, in accordance with some embodiments of the presently disclosed subject matter.

Attention is directed to FIG. 4, which illustrates a flow diagram of an example method of identifying, during runtime loading, a software-module associated with a first application framework, in accordance with some embodiments of the presently disclosed subject matter.

Optionally: processing circuitry 310 can detect (400), in an interposition function 365A, an invocation (e.g. by an application) of a software function 345A (e.g. an eBPF "attached" function) that is a non-final step of a multi-step software-module load process. As described above, an interposition function can execute before the main code of the attached function, after the main code of the attached function, or in a manner partially or fully concurrent with the main code of the attached function. In some embodiments processing circuitry 310 is configured to execute two distinct interposition functions—one before and one after the main code of the attached function, etc.

In some embodiments, interposition function 365A can access parameter data of the function invocation i.e. data that is supplied (e.g. by the invoking application) to the software function 345A that is part of the load process. By way of non-limiting example: interposition function 365A can access the parameter data from a processor stack, and/or from memory locations whose memory addresses are parameters on the processor stack. It is noted that in some embodiments, the parameter data accessible by the interposition function can be data that is located in memory and is derivative of, or informative of the data supplied in the invocation of software function 345A.

It is noted that interposition function 365A can utilize accessed parameter data in any suitable manner. As an example: interposition function 365A can access data located at an offset of a memory location that was indicated in the supplied parameter data, and can decode or decrypt the accessed data from the offset.

In some embodiments, interposition function 365A can access context data (e.g. an application instance identifier such as a Linux process id) of the operating system (OS) application (or "process") that is invoking software function 345A. By way of non-limiting example: interposition function 365A can access the invoking process context data from the processor stack.

It is noted that interposition function 365A can utilize any suitable value or values of the invoking process context data. For example: interposition function 365A can access a process identifier, a return codes of the attached function (as this are part of the invoking process context data) etc.

In some embodiments where processing circuitry 310 has detected the invocation of an attached software function that is a non-final step of a multi-step software-module load process, processing circuitry 310 (e.g. interposition function 365A or a different component) can evaluate (415) whether the parameter data and/or context data meets a "storing criterion". A storing criterion can be an application-framework-specific data characteristic indicating whether the parameter data and/or context data is useful in identification of a software module being loaded. By way of non-limiting example, the storing criterion can be whether the identifier of the application instance (e.g. process Id) in the context data matches a process Id observed previously (e,g, within a certain time frame). By way of further non-limiting example, the storing criterion can be whether a function parameter of this invocation corresponds to a value indicative of a particular application framework. By way of further non-limiting example, the storing criterion can be the logical conjunction of both these examples. Further examples of software-module load storing criteria are described below, with reference to FIGS. 6A-6B. Thus, if the parameter data and/or context data meets a storing criterion, processing can continue to step 410. Otherwise, processing can return to step 400.

In some other embodiments, processing circuitry 310 does not evaluate whether the parameter data meets a "storing criterion" and simply continues to step 410.

Processing circuitry 310 can then (e.g. in the interposition function 365A itself, or in a different software function) store (410) some or all of the parameter data (or data derivative of some or all of the parameter data) to volatile media, or non-volatile media (e.g. kernel memory). Processing circuitry 310 can also save context data of the OS process invoking the detected software function that is part of the multi-step software-module load process e.g. processing circuitry 310 can store an application instance identifier, such as a process id of the invoking process.

In some embodiments, processing circuitry 310 (e.g. interposition function 365A, or a second interposition function (not shown)) can then copy the stored data from kernel memory to a memory that is accessible by RBOM app 380.

In some other embodiments, processing circuitry 310 (e.g. interposition function 365A) performs the initial storing to a memory that is accessible by RBOM app 380.

Figure 5:
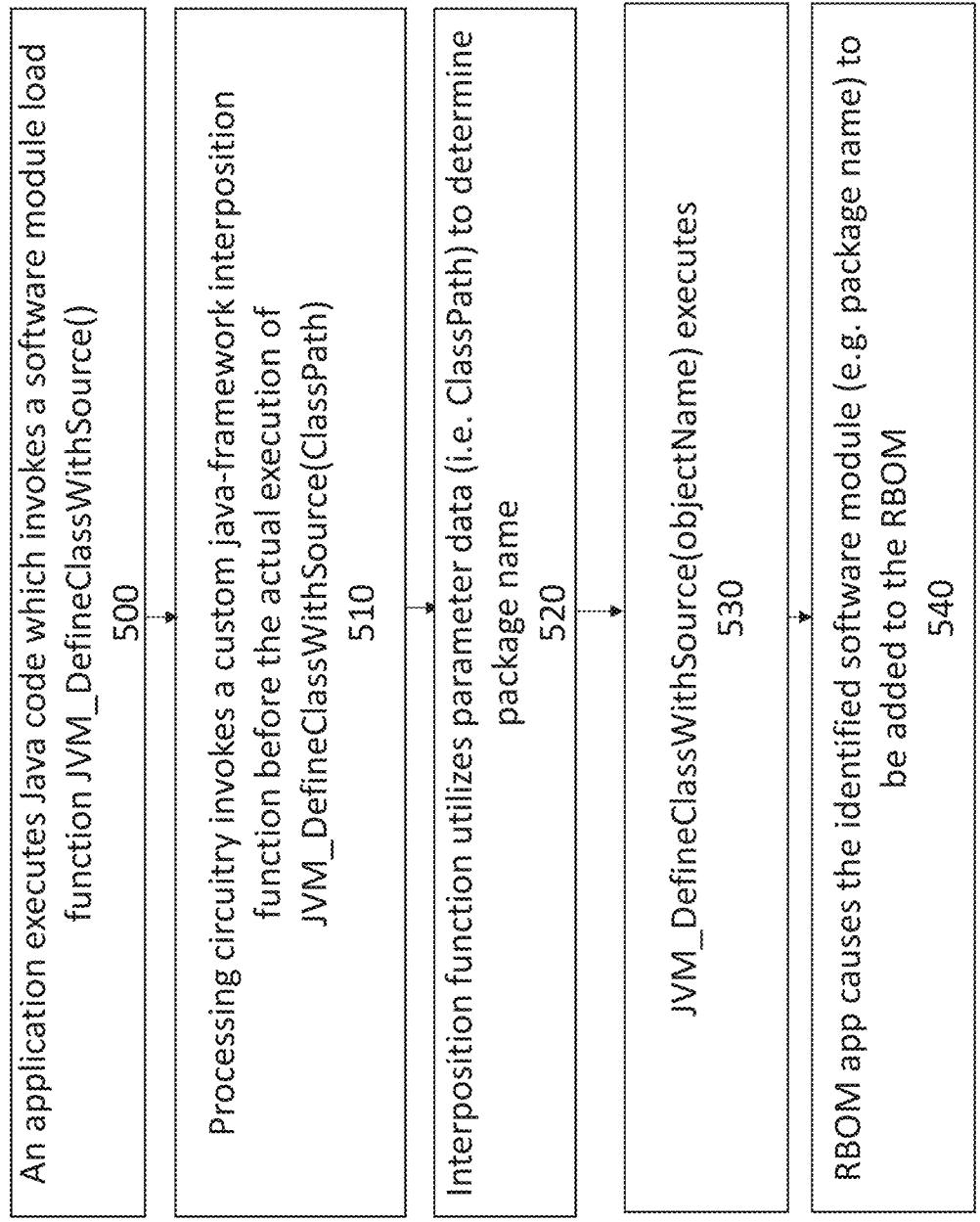
FIG. 5 illustrates a flow diagram of an example method of detecting runtime loading of a software module, in accordance with some embodiments of the presently disclosed subject matter.
Figure 6A:
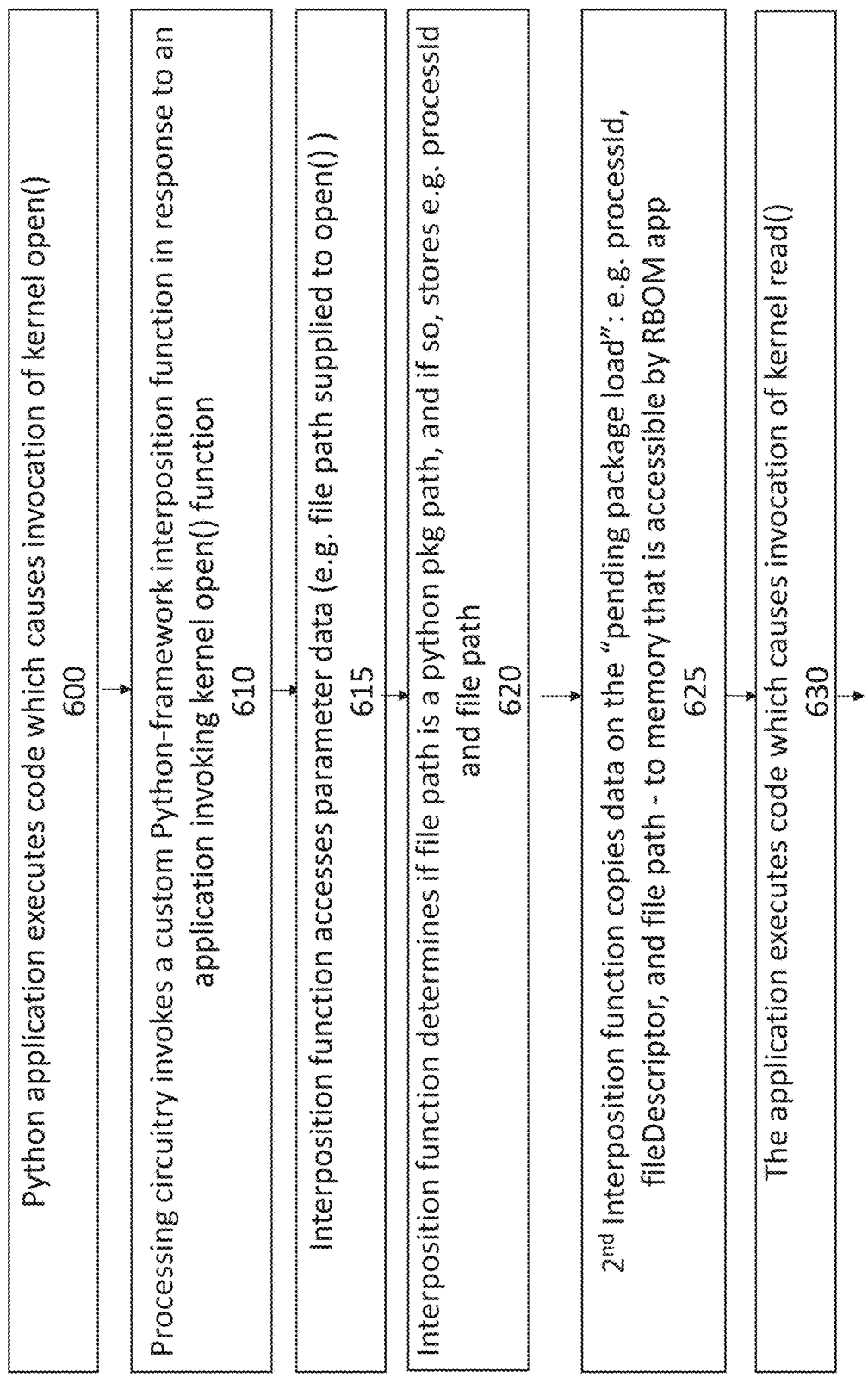
FIGS. 6A-6B, illustrates a flow diagram of an example method of detecting runtime loading of a software module, in accordance with some embodiments of the presently disclosed subject matter.
Figure 6B:
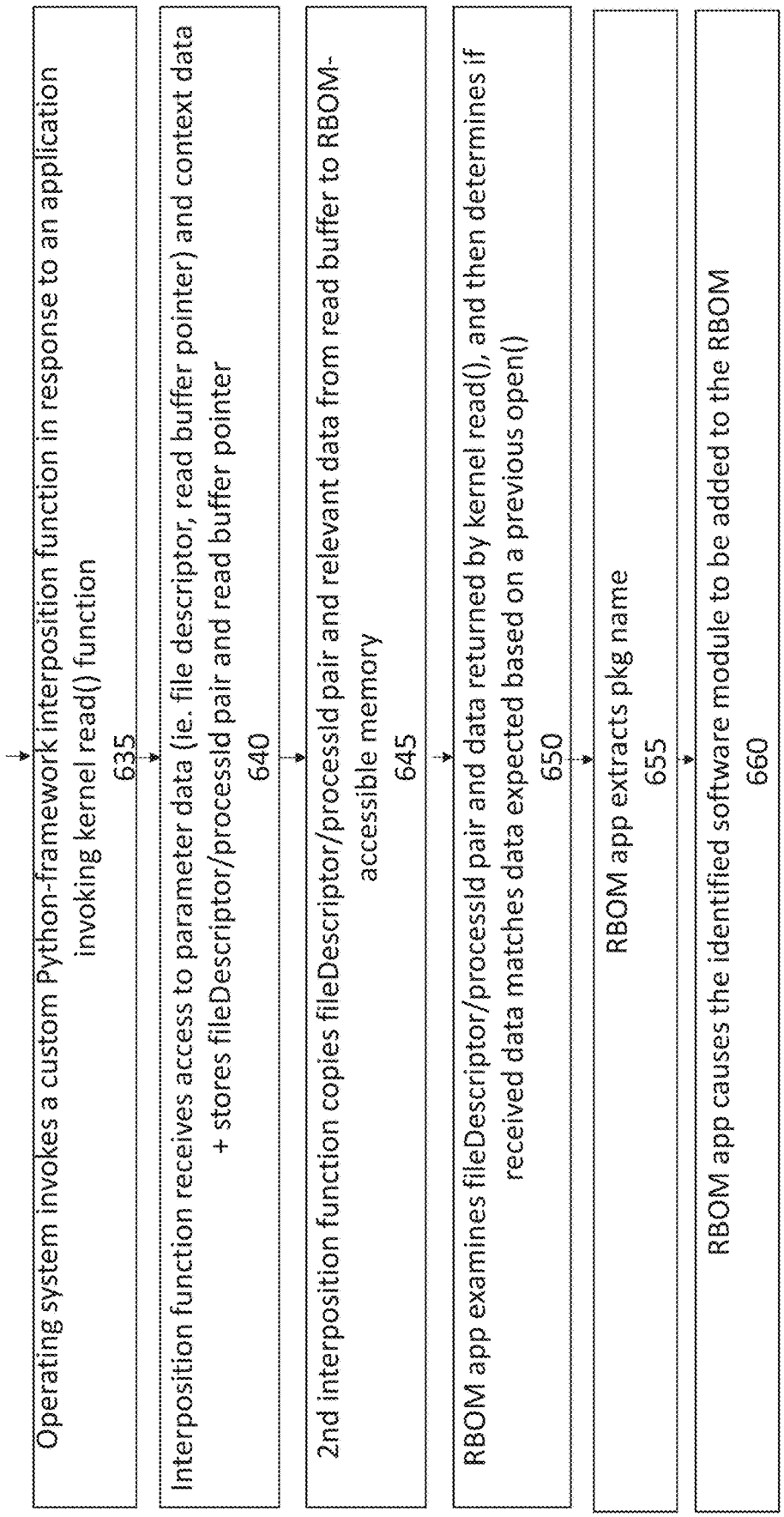

It is noted that in the Java example illustrated in FIG. 5, detection of a single function call is sufficient to identify a loading of a software module (so that steps 400-410 are not necessary), and in the Python example of FIGS. 6A-6B, two detected function calls are sufficient (so that steps 400-410 can execute once), while in some other examples or application frameworks, three or more detected function calls might be utilized in order to identify a software module loading, so that steps 400-410 can execute two or more times (e.g. each time with a different detected function that is a non-final step of the multi-step software-module load process, and with a different corresponding interposition function).

It is noted that in some embodiments processing circuitry 310 is configured so that interposition function 365A detects each invocation of software function 345A. In some such embodiments, software function 345A may in fact be invoked as part of loading software modules of the application framework—as well as for other purposes. Accordingly, in such embodiments processing circuitry 310 can be configured to perform the optional evaluation of whether the storing criterion has been met—so as to avoid storing data from invocations that are not in actuality performing software module loading. See for example the Python example of FIGS. 6A-6B below.

Processing circuitry 310 can next detect (420), in an interposition function 365B, an invocation (e.g. by an application) of a software function 345B that is e.g. the final step of a single-step or multi-step software-module load sequence. The interposition function can also access parameter data that is being supplied (e.g. by the application) to the invoked software function that is e.g. the final step of the load sequence. The interposition function 365B can also access context data of the invoking application (or process). The interposition function 365B can also, when executing subsequent to the main code of the attached function, access the return code of attached function 345B (e.g. to determine whether the attached function completed successfully). The interposition function can execute before the main code of the attached function 345B, after the main code of the attached function 345B, or partly or fully concurrently with the main code of the attached function 345B. In some embodiments processing circuitry 310 is configured to execute separate interposition functions: one before and one after the execution of main code of the attached function 345B.

Optionally: processing circuitry 310 (e.g. interposition function 365B or a different component) can next evaluate (425) whether the parameter data, context data, and/or the return code of the attached function meets a "completion criterion". A completion criterion can be an application-framework-specific data characteristic indicating whether the parameter data or context data (or data derivative of these) indicate that the loading of the software module is completed. In some embodiments, a completion criterion can be a data characteristic indicating that data sufficient to indicate the name of the loaded software module has been obtained. Thus, if the parameter data or context data (or data derivative of these) meets a completion criterion, processing can continue to step 430 and terminate otherwise.

In some other embodiments, processing circuitry 310 does not evaluate whether the data meets a "completion criterion" and continues to step 430. Examples of software-module load completion criteria are described below, with reference to FIGS. 6A-6B.

Processing circuitry 310 can next identify (430) the specific newly loaded software module (e.g. determine a character string denoting a module name).

Processing circuitry 310 can perform the identification based on one or more of:
- the parameter data supplied in the invocation
- the context data of the invoking process (e.g. an application identifier such as a process id)
- the return code of the attached function
- data that was previously stored e.g. in response to detection of prior invocations of attached functions by one or more respective prior interposition functions).

It is noted that in some embodiments processing circuitry 310 is configured so that interposition function 365B detects each invocation of software function 345B. In some such embodiments, software function 345B may in fact be invoked as part of loading software modules of the application framework—as well as for other purposes. Accordingly, in such embodiments processing circuitry 310 can be configured to perform the optional evaluation of whether the completion criterion has been met—so as to avoid determining module names from invocations that are not in actuality performing software module loading.

Processing circuitry 310 can then add (440) the identified software module to a list of active software modules.

It is noted that processing circuitry 310 can perform the method described in FIG. 4 on an ongoing basis (e.g. in response to each invocation of software load functions associated with runtime loading of software modules, or in response to a subset of these invocations) and in this manner can maintain an up-to-date software runtime bill-of-materials.

Attention is directed to FIG. 5, which illustrates a flow diagram of an example method of detecting runtime loading of a software module, in accordance with some embodiments of the presently disclosed subject matter.

The example method illustrated in FIG. 5 can be applicable to detection of loading of software modules in application frameworks (such as, in some examples, Java) wherein the software module loading is accomplished via a single software module load function. Accordingly, a single interposition function can monitor the software module load function to determine the identity of a software module being loaded. The example method illustrated in FIG. 5 refers to components illustrated in FIG. 3B. For the purposes of describing FIG. 5, it is posited that application 360B is a Java Runtime Environment.

Accordingly, RBOM-enabled computer system 300 can be configured so that an interposition function 365C executes in response to e.g. Java Runtime Environment 360B invoking the single software module load function (i.e. JVM_DefineClassWithSource in some examples). By way of non-limiting example: a custom eBPF function can be attached to JVM_DefineClassWithSource( ) e.g. via the Linux uprobe facility.

Processing circuitry 310 (for example: application 360B) can then execute (500) Java code which invokes a software module load function (i.e. JVM_DefineClassWithSource( ) in some examples).

Processing circuitry 310 (e.g. an operating system (not shown)) can then invoke (510) interposition function 365C. Interposition function 365C can be a function custom-built for a Java application framework. Interposition function 365C can access parameter data that was supplied by application 360B to JVM_DefineClassWithSource( ) (i.e. the ClassPath parameter in some examples).

Processing circuitry 310 (e.g. interposition function 365C) can next determine (520) the Java package name (which is an identity of the newly loaded software module) from the ClassPath parameter. By way of non-limiting example, processing circuitry 310 (e.g. interposition function 365C) can determine that the ClassPath parameter value of "myJavaPackage" indicates that "myJavaPackage" is being loaded.

In some embodiments, interposition function 365C writes the package name (i.e. software module identity) to memory that is accessible by RBOM app 370.

In some other embodiments, interposition function 365C writes the package name (i.e. software module identity) to a memory that is accessible to a subsequent interposition function that executes following completion of the main code of JVM_DefineClassWithSource.

Processing circuitry 310 (e.g. application 360B) can then complete the execution 530 of JVM_DefineClassWithSource. In some embodiments, another interposition function can be run in relation to the completion of JVM_DefineClassWithSource (e.g. via linux kretprobe) to confirm that the return code of JVM_DefineClassWithSource is indicative with high probability of successful module loading, and can then mark in memory that the module load has in fact fully completed.

It is noted that in some embodiments, the operating system first initializes JVM_DefineClassWithSource( ) then executes interposition function 365C, and then executes the main code of JVM_DefineClassWithSource( )

Processing circuitry 310 (e.g. RBOM app 370) can then add (530) the identified software module (e.g. as written to the shared memory by interposition function 365C) to a list of active software modules.

Attention is directed to FIG. 6A-6B, which is a flow diagram of an example method of detecting runtime loading of a software module, in accordance with some embodiments of the presently disclosed subject matter.

The example method illustrated in FIGS. 6A-6B can be applicable to detection of loading of software modules in application frameworks (such as, in some examples, Python) wherein two software module load functions are invoked (in a sequence) in the course of software module loading. The example method illustrated in FIGS. 6A-6B refers—for explanatory and clarity purposes—to components illustrated in FIG. 3A.

Accordingly, RBOM-enabled computer system 300 can be configured so that interposition function 365A executes in response to e.g. application 360A invoking the first (i.e. non-final) software module load function (i.e. kernel function 345A), and interposition function 365B executes in response to e.g. application 360A invoking the second (e.g. final) software module load function (i.e. kernel function 345B).

By way of non-limiting example: the kernel functions 345A kernel function 345B can be Linux open( ) and Linux read( ) respectively. In this case, two custom eBPF functions can be attached to Linux kernel functions open( ) and read( ) respectively e.g. via the Linux kprobe facility.

Python's use of open( ) and read( ) to dynamically load software modules is described in more detail in the course of the description of module name identification method hereinbelow.

Processing circuitry 310 (for example: application 160A) can execute (600) instructions which invoke the kernel open( ) function 345A for the purpose of loading a new Python library.

Processing circuitry 310 (e.g. an operating system (not shown)) can then invoke (610) the interposition function 365A attached to the kernel open( ) function 345A.

Interposition function 365A can then access (615) parameter data that was supplied by application 360A (i.e. the file path of the open( ), in some examples).

Interposition function 365A can then determine (620) whether the accessed file path is of the form used by Python packages on the particular RBOM-enabled computer system 300. In some examples, the path "/usr/local/lib/python3.9/site-packages/websocket_client-1.3.2.dist-info/META-DATA" can be an example of a path of a Python package. It is noted that the determining whether the parameter data is a file path of the correct form can be an example of determining whether the parameter data meets a software-module load storing criterion.

If the parameter data is in fact in the form of a python package file name, interposition function 365A can then store data pertaining to the invocation of the open( ) function for subsequent use in determining the identity of the software module whose load is currently in progress. For example, interposition function 365A can store the file path. Interposition function 365A can also store data from the context of the process which invoked the first function (e.g. Linux process id, which is usable to identify the application instance).

It is noted that in some embodiments, a component other than interposition function 365A can perform the storing.

In some embodiments, processing circuitry 310 (for example: a second interposition function (not shown)) can execute after completion of the main open( ) code, and can access the return value of the open( ) function (i.e. the file descriptor created by the open( ). The second interposition function can then copy (625) e.g. the file descriptor, together with the process Id of the invoking application, and the filename to memory that is accessible by RBOM app 380.

Next, processing circuitry 310 (for example: application 360A) can execute (630) additional code which in turn invokes the kernel read( ) function 345B.

Processing circuitry 310 can then invoke (635) the interposition function 365B attached to the kernel read( ) function 345B.

Processing circuitry 310 (e.g. interposition function 165B) can then access (640) parameter data supplied by application 360B to kernel function 345B (i.e. the file descriptor of the read, and the pointer to the read buffer, in some examples). Processing circuitry 310 (e.g. interposition function 165B) can also access an application instance identifier (e.g. process Id) from the context data of the invoking function. In some embodiments, processing circuitry 310 (e.g. interposition function 165B) can store the buffer pointer, application instance identifier etc. to memory for subsequent access by e.g. a second interposition function.

Subsequent to completion of the read( ) operation (which filled the read memory buffer with data read from the file descriptor), processing circuitry 310 (e.g. a second interposition function (not shown)) can next copy (645) data (e.g. the file descriptor, process identifier, and relevant data from the read buffer—indicated by e.g. a stored pointer originally supplied in the parameter data) to e.g. memory that is accessible by RBOM app 370.

Processing circuitry 310 (e.g. RBOM app 370) can next examine (650) e.g. the copied fileDescriptor/processId to determine if a Python package load is pending for the fileDescriptor/processId pair (e.g. as indicated by a previous open( ).

If so, processing circuitry 310 (e.g. RBOM app 370) can examine the data returned by the kernel read( ) (and copied to the RBOM app memory buffer) and determine (650) whether the data received by the read( ) matches the data expected for pending Python package.

For example, in some examples, the data of the file is—in some examples—expected to have data in a format corresponding to the following structure:

{
    Metadata-Version: 2.1
    Name: websocket-client
    Version: 1.3.2
}

Processing circuitry 310 (e.g. RBOM app 370) can then extract (650) the Python package name (e.g. "websocket-client") from the file data. Processing circuitry 310 (e.g. RBOM app 165B) can also identify other data such as version from the file data.

Processing circuitry 310 (e.g. RBOM app 370) can then cause (660) the identified software module to be added to the RBOM.

Figure 7:
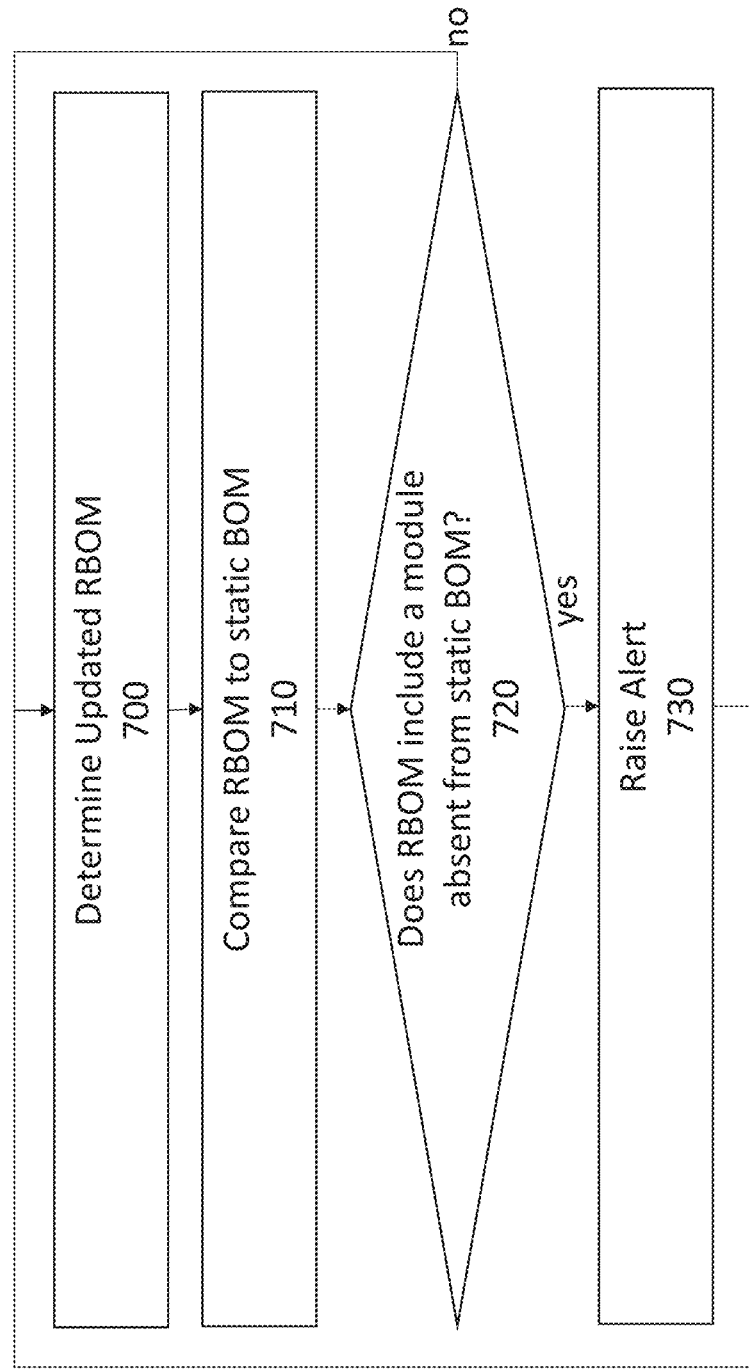
FIG. 7 illustrates a flow diagram of an example method utilizing a software runtime bill-of-materials to detect possible malware, in accordance with some embodiments of the presently disclosed subject matter.

Attention is now directed to FIG. 7, which is a flow diagram of an example method utilizing a software runtime bill-of-materials to detect possible malware, in accordance with some embodiments of the presently disclosed subject matter.

Processing circuitry 310 (for example: a security application) can determine (700) an updated software runtime bill-of-materials (RBOM) (for example: by utilizing methods such as those described above with reference to FIGS. 4-6).

Processing circuitry 310 (for example: a security application) can then compare (710) the current RBOM to a static BOM (i.e. a software bill-of materials compiled using static code analysis).

In particular, processing circuitry 310 (for example: a security application) can determine (720) whether the RBOM includes a software module that was not part of the static BOM.

If such a module is detected, it can be an indication that unauthorized software (such as malware is present in RBOM-enabled computer system 300. Accordingly, processing circuitry 310 (for example: a security application) can raise (730) an alert indicating a potential security issue.

Figure 8:
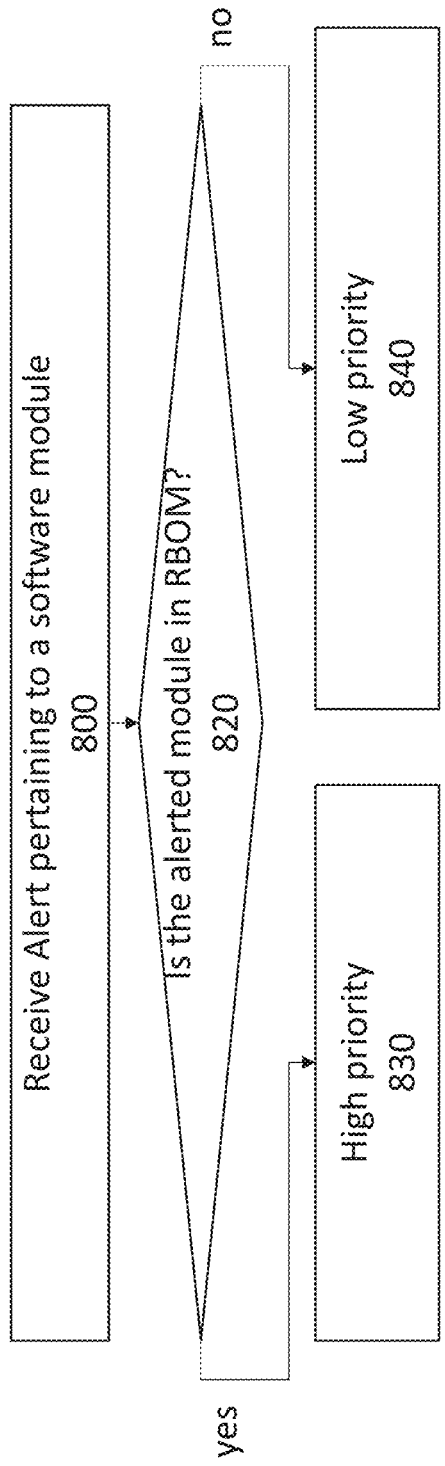
FIG. 8 illustrates a flow diagram of an example method utilizing a software runtime bill-of-materials to prioritize software vulnerability alerting, in accordance with some embodiments of the presently disclosed subject matter.

Attention is now directed to FIG. 8, which is a flow diagram of an example method utilizing a software runtime bill-of-materials to prioritize software vulnerability alerting, in accordance with some embodiments of the presently disclosed subject matter.

Processing circuitry 310 (for example: a security application) can receive (800) a notification of a security vulnerability in a particular software module.

As described hereinabove, the software module with the vulnerability may in fact be in use, in which case the alert is likely to be regarded as higher priority. Alternatively, the software module with the vulnerability may actually be run rarely (or not at all), in which case the alert is likely to be regarded as lower priority.

Processing circuitry 310 (for example: a security application) can then determine (820) whether the alerted module is in fact part of the RBOM, and then select either high priority (830) or low priority (840) accordingly.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A processor-based method of runtime identification of a loading of a software-module, in a computer system, the software-module being associated with a first application framework, the method comprising:
    a) detecting, by a first interposition function, an invocation of a first function, wherein the first function is associated with loading of software-modules within the first application framework;
    b) identifying a software-module being loaded,
    the identifying utilizing, at least one of:
        i) parameter data supplied in the invocation of the first function,
        ii) context of an operating system process invoking the first function, and
        iii) data that was stored responsive to detecting, by a respective interposition function, one or more prior invocations of respective functions associated with loading of software-modules within the first application framework; and
    c) adding the identified software-module to a list of software-modules, wherein the list comprises zero or more active software-modules.

2. The method of claim 1, wherein the identifying the software module utilizes the parameter data, and wherein the utilizing comprises: decoding data that is located at an offset from a memory address that is comprised in the parameter data.

3. The method of claim 1, wherein the identifying the software module utilizes at least one of:
    a) a process identifier of the invoking operating system process context, and
    b) an element of the invoking operating system process context indicative of a result returned by the first function.

4. The method of claim 1, the method further comprising, prior to step a):
    A) detecting, by a second interposition function, an invocation of a second function associated with loading of software-modules within the first application framework; and
    B) storing data that comprises, at least, at least one of:
        i) parameter data supplied in the invocation of the second function, and
        ii) context of an operating system process invoking the second function.

5. The method of claim 4, the method further comprising:
    C) repeating A)-B) for one or more additional functions associated with loading of software-modules within the first application framework, and respective interposition functions.

6. The method of claim 1, the method further comprising:
    d) performing a)-c) repeatedly, thereby giving rise to a runtime software bill-of-materials (RBOM).

7. The method of claim 6, the method further comprising:
    e) repeating a)-d) for one or more additional application frameworks,
thereby giving rise to an RBOM comprising modules of multiple application frameworks.

8. The method of claim 7, the method additionally comprising:
    comparing the RBOM to a given list of software modules of the first application framework, wherein the given list is derivative of an at least partial static analysis of the computer system; and
    responsive to a presence of a software module in the RBOM that is absent from the given list, raising an alert.

9. The method of claim 7, the method additionally comprising:
    receiving an alert pertaining to a first software module; and
    determining a priority of the alert in accordance with whether the first software module is present in the RBOM.

10. The method of claim 6, the method additionally comprising:
    comparing the RBOM to a given list of software modules of the first application framework, wherein the given list is derivative of an at least partial static analysis of the computer system; and
    responsive to a presence of a software module in the RBOM that is absent from the given list, raising an alert.

11. The method of claim 6, the method additionally comprising:
    receiving an alert pertaining to a first software module; and
    determining a priority of the alert in accordance with whether the first software module is present in the RBOM.

12. The method of claim 1, wherein the first application framework is of an application framework type selected from a list consisting of: interpreted language, intermediate language, and compiled language.

13. The method of claim 1, wherein the first application framework is selected from a list consisting of: Python, Java, Node.js, C, C++, and C#.

14. A computer system of runtime identification of a loading of a software module associated with a first application framework, the system comprising a processing circuitry, the processing circuitry being configured to:
   a) detect, in a first interposition function, each invocation of a first function, the first function being associated with loading of software-modules within the first application framework; and
   b) responsive to, at least, at least one of:
      a. parameter data supplied in a given invocation, and
      b. a context of an invoking OS process of the given invocation
   meeting a respective software-module load completion criterion:
      A. identify a software-module being loaded, the identifying utilizing, at least, at least one of:
         i) parameter data supplied in the given invocation,
         ii) a context of an invoking operating system process of the given invocation, and
         iii) data that was stored responsive to detecting, by respective interposition functions, respective prior invocations of respective functions associated with loading of software-modules within the first application framework; and
      B. add the identified software-module to a list of software-modules, wherein the list comprises zero or more active software modules,
   thereby giving rise to a runtime software bill-of-materials (RBOM).

15. The system of claim 14, wherein the processing circuitry is further configured to, prior to step a):
   A) detect, in a second interposition function, each invocation of a second function associated with loading of software-modules within the first application framework; and
   B) responsive to, at least, at least one of:
      a. parameter data supplied in a given invocation, and
      b. a context of an invoking OS process of the given invocation
   meeting a software-module load storing criterion:
      store at least one of:
         i) at least part of the parameter data supplied in the given invocation, and
         ii) at least part of the context of the invoking operating system process of the given invocation.

16. A computer program product comprising a computer readable non-transitory storage medium containing program instructions, which program instructions when read by a processing circuitry, cause the processing circuitry to perform a method of runtime identification of a loading of a software-module, the method comprising:
   a) detecting, by a first interposition function, an invocation of a first function, wherein the first function is associated with loading of software-modules within the first application framework;
   b) identifying a software-module being loaded, the identifying utilizing, at least one of:
      i) parameter data supplied in the invocation of the first function,
      ii) context of an operating system process invoking the first function, and
      iii) data that was stored responsive to detecting, by a respective interposition function, one or more prior invocations of respective functions associated with loading of software-modules within the first application framework; and
   c) adding the identified software-module to a list of software-modules, wherein the list comprises zero or more active software modules.

17. The computer program product of claim 16, the method further comprising, prior to step a):
   A) detecting, by a second interposition function, an invocation of a second function associated with loading of software-modules within the first application framework; and
   B) storing data that comprises, at least, at least one of:
      i) parameter data supplied in the invocation of the second function, and
      ii) context of an operating system process invoking the second function.

18. A computer program product comprising a computer readable non-transitory storage medium containing program instructions, which program instructions when read by a processing circuitry, cause the processing circuitry to perform a method of of runtime identification of a loading of a software-module, the method comprising:
   a) detecting, in a first interposition function, each invocation of a first function, the first function being associated with loading of software-modules within the first application framework; and
   b) responsive to, at least, at least one of:
      a. parameter data supplied in a given invocation, and
      b. a context of an invoking OS process of the given invocation
   meeting a respective software-module load completion criterion:
      A. identifying a software-module being loaded, the identifying utilizing, at least, at least one of:
         i) parameter data supplied in the given invocation,
         ii) a context of an invoking operating system process of the given invocation, and
         iii) data that was stored responsive to detecting, by respective interposition functions, respective prior invocations of respective functions associated with loading of software-modules within the first application framework; and
      B. adding the identified software-module to a list of software-modules, wherein the list comprises zero or more active software modules,
   thereby giving rise to a runtime software bill-of-materials (RBOM).

19. The computer program product of claim 18, the method further comprising, prior to step a):
   A) detect, in a second interposition function, each invocation of a second function associated with loading of software-modules within the first application framework; and
   B) responsive to, at least, at least one of:
      a. parameter data supplied in a given invocation, and
      b. a context of an invoking OS process of the given invocation
   meeting a software-module load storing criterion:
      store at least one of:
         i) at least part of the parameter data supplied in the given invocation, and
         ii) at least part of the context of the invoking operating system process of the given invocation.

* * * * *